July 16, 1946.　　　　　A. C. OLSEN　　　　　2,404,245
FASTENING DEVICE
Filed Dec. 8, 1944
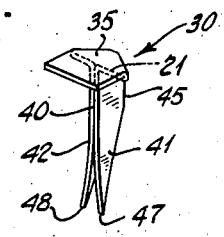
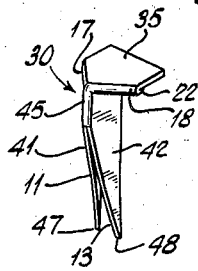
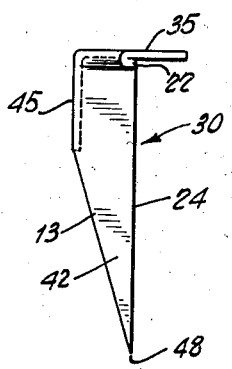
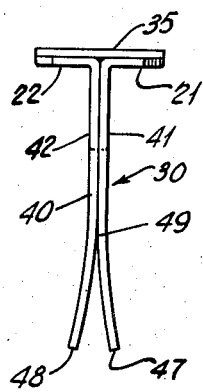
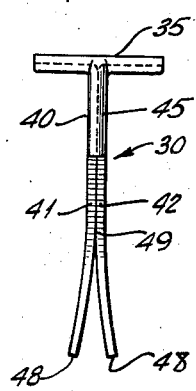
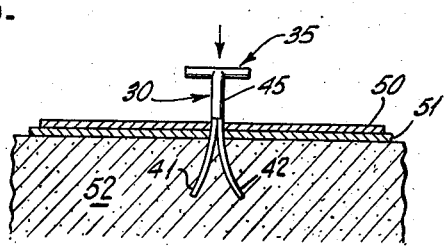
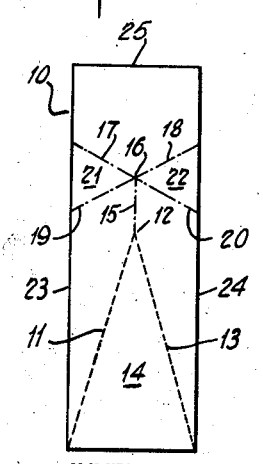
INVENTOR
ANDERS C. OLSEN.
BY
ATTORNEY Patented July 16, 1946

2,404,245

UNITED STATES PATENT OFFICE 2,404,245

FASTENING DEVICE

Anders C. Olsen, Forest Hills, N. Y.

Application December 8, 1944, Serial No. 567,245

4 Claims. (Cl. 85—11)

This invention relates to fastening devices of the driven class. One adaptation of the invention is in building construction and, more particularly, for securing flexible-type, weatherproof covering materials, such as roofing shingles and the like, to sheathing or other supporting surfaces of the type characterized by a low degree of nail-holding power.

My invention is particularly concerned with the provision of a fastening device for use in low-cost building construction wherein flexible-type, weatherproof roofing or siding is to be secured to sheathing of gypsum board, fiber insulation board or other similar types of protective sheathing generally possessing low nail-holding characteristics.

An object of the invention is to provide a fastening device for that purpose which will be of simple, inexpensive design and will possess adequate holding power when driven into sheathing materials of the above described character. It is also an object of the invention to provide a fastener which will be highly efficient in securing flexible and frangible covering materials to sheathing material of the character described, and which is designed to offer maximum resistance to the tearing loose of such covering material under the stress of severe weather conditions involving high winds, hail or driving rainstorms.

A further object of the invention is to provide a fastening device of the character indicated, which can be easily handled and readily applied.

Other objects and features of the invention will be more clearly apparent from the detailed description which is to follow and from the accompanying drawing in which:

Figs. 1 and 2 are opposite perspective views of a fastening device embodying the present invention;

Fig. 3 is an enlarged elevation view of the fastening device.

Figs. 4 and 5 are right and left hand views, respectively, of the device shown in Fig. 3;

Fig. 6 is a fragmentary view illustrating the action of the fastener in one application of the present invention;

Fig. 7 is a view similar to Fig. 6 showing the device of the present invention in its fully driven position, and Fig. 8 is a plan view of the strip or blank from which the device of the present invention is formed, with cut and fold lines indicated thereon.

As distinguished from the ordinary wire nails or other nail-like fasteners of the driven class, the fastening device of the present invention is formed from a flat metal strip or blank shown in Fig. 8. The metal strip or blank, designated by the reference numeral 10, may be cut from a continuous ribbon into a substantially rectangular configuration, as shown, and stamped out or otherwise cut along the converging diagonal lines 11 and 13, meeting as at 12, or if desired connected by a short horizontal cut, to remove the triangular piece 14 defined thereby. The thus stamped strip or blank 10 may be then folded longitudinally substantially along the median fold line 15 extending from the cutout at 12 to the intersection point indicated at 16 to form the juxtaposed but separable legs comprising the shank portion of the fastener. The strip or blank 10 is also bent or folded substantially along the lines 17 and 18 in a direction toward the shank, and reversely along the lines 19 and 20, whereby to form the head portion of the fastener lying in a plane which extends substantially at right angles to the plane of the shank portion.

In thus forming the fastening device, the triangular web or hinge portions 21 and 22, respectively defined by the fold or bend lines 17—19 and 18—20, are doubled beneath the head portion on either side of the shank, as indicated in Figs. 1-5, and they serve to reinforce the head portion. With this arrangement, the outer straight edges 23 and 24 of the blank form the inner edges of the separable legs at a linear position which is substantially centrally located with respect to the distance along the head portion between the point 16 and the opposite straight edge 25 and, thus, practically coincident with the vertical axis of the head portion.

Referring now more particularly to Figs. 1 and 2, the reference numeral 30 designates the fastening device of the present invention, which is formed from a flat metal strip 10, as above described. As shown, the fastener comprises a nail-like device having a head portion 35 and a shank portion 40 integral therewith. As previously indicated, the shank portion lies in a plane extending substantially at a right angle to the head portion and comprises a pair of separable legs 41 and 42 connected to each other along the longitudinal fold 45 and to the head portion 35 by the webs 21 and 22 folded underneath the head portion and in contact therewith.

As best shown in Figs. 2 and 3, the identically beveled legs 41 and 42 taper from the lower end of the longitudinal fold 45 along their respective sides 11 and 13 to their respective pointed ends 47 and 48. Thus, the pointed ends 47 and 48 will be substantially centrally located relative to the perimeter of the head portion 35. These ends 47 and 48 are divergently bent from a point along the shank 40 indicated by the numeral 49 which is preferably at approximately the midpoint between the lower end of the fold 45 and the pointed ends 47, 48.

In utilizing the above described fastener to secure, for example, plies of flexible roofing material to a roof deck comprising fireproof gypsum board, as illustrated in Figs. 6 and 7, the fastener is handled in the same manner as an ordinary wire roofing nail and may be driven into the roofing and underlying sheathing with the aid of a hammer. The pointed ends 47 and 48 of the separable, beveled legs 41 and 42 will, of course, readily pierce the flexible roofing plies 50 and 51 and also pierce the frangible gypsum sheathing 52 lying underneath. As the fastener shank is driven into the sheathing, the already divergently bent legs 41 and 42 will continue to spread along divergent paths depicted in Fig. 6, until they assume a position approximately as indicated in Fig. 7. When the fastener is driven "home" so that the head 35 bears down against the outer ply 50 of the overlapped plies of roofing, the diverging courses taken by the separating legs will resemble somewhat the illustration in Fig. 7.

With the legs of the fastener shank thus extending in arcuately divergent paths within the sheathing board 52, it would require a substantially greater force to render the fastener ineffective in securely holding the roof covering material 50 and 51 to a roof deck than would be required in the case of an ordinary wire roofing nail, or even one that was provided with a barbed shank, and especially when the roof deck is constructed with gypsum or fiber insulation board or some such material that is characteristically poor in nail-holding properties. In fact, the present invention provides a fastener for use with low nail-holding power materials that will require a pulling force about on a part with the force required to remove a roofing nail from a roof deck constructed with a material having high nail-holding characteristics, such as wood.

Another important factor to be considered in designing fasteners that will be efficient in securing a flexible type roofing material to a roof deck is the stress and strain imposed on the roof covering and the fasteners therefor by severe weather conditions involving high winds, hail or driving rainstorms. Under such conditions, there is a tendency for the flexible roofing to be lifted up against the heads of the nails or other type fasteners holding the roofing in place and, unless these heads are each wide enough to provide a reasonable amount of bearing surface, the roofing ofttimes will be torn and ripped away from the fastener head. By forming the fastener of the present invention from a metal strip of any desired width, there may be provided a fastener head which has sufficient bearing surface to avoid the aforementioned danger. In the case of the ordinary wire nail, or flat-headed wire staple, on the other hand, the size of the head is necessarily limited to the largest diameter of wire used in making the fastener.

As one practical embodiment of my invention, I may form a fastener of the above described character from an 18 gauge flat strip of hot-rolled, annealed sheet steel having dimensions of say ½" x 1½". In this instance, the beveled legs of the thus-formed fastener will preferably be about ¾" long, measured from the lower end of fold 45 to the pointed ends, and bent outwardly beginning at about 7/8" up from the pointed ends so that the latter are spaced apart about ⅛", for this gauge metal. This initial spread of the pointed ends is an important feature of the invention as it enables the separable legs to be easily forced apart, when the fastener is driven into the sheathing, to achieve the optimum in holding power with respect to the sheathing material into which the fastener is driven.

In order to evaluate the holding power of my fasteners for comparison purposes, I used them to fasten, in the usual manner, two superposed layers of mineral surfaced roofing (weighing 90 pounds per 108 square feet) to a gypsum roof deck. The ends of the roofing strips were pulled until the roofing ripped around the head of one of the fasteners. After a number of tests, it was found that an average of about 45 pounds was required to rip the roofing, or pull the fastener from the gypsum board. By way of comparison, the ordinary ⅞" galvanized roofing nail (⅜" diameter head) required only slightly more than 14 pounds pulling force to remove it from the same construction of two layers of 90 pound mineral surfaced roofing secured to gypsum roof deck.

The enhanced holding power obtained by employing the fasteners of the present invention even exceeds the above-stated average of about 40 pounds required to free two layers of 90 pound roofing nailed to a wood roof deck with standard ⅞" roofing nails. Then, too, these improved fasteners can be handled like nails, require no more care to their application than the ordinary nails, since they consistently drive well without bending or twisting, and are of such simple design as to permit rapid, large scale production at a cost which would not prohibit their use in place of ordinary wire nails. Finally, the simple, improved fastener of the present invention enables the construction of buildings having insulated, fireproof and weatherproof roofs and side walls where it is desired to employ relatively inexpensive flexible or generally frangible type covering material in conjunction with sheathing or roof decking of the character possessing low nail-holding power.

While I have particularly described my fastener as being adapted for use in the aforedescribed type of building construction, it will be understood that this form of fastener is also capable of being efficiently used in other type of construction, such as furniture, vehicles, toys or the like, where sheet material is to be secured to a supporting base possessing a degree of nail-holding power ranging from the low nail-holding power of materials on the order of insulation board to the high nail-holding power of wood, and may also be used for securing sheet material to wood in building construction.

I claim:

1. A fastening device fabricated from a flat metal strip bent at one end to provide a head portion and folded longitudinally to provide a shank portion lying in a plane at a right angle to the plane of the head portion, said shank portion comprising legs juxtaposed for a substantial distance along their length, said legs being connected together for a distance along the longitudinal fold and terminating in divergently-bent points whereby said legs are adapted to diverge when forced into fastening position.

2. A fastening device fabricated from a flat metal strip bent at one end to provide a head portion and folded longitudinally to provide a shank portion lying in a plane at a right angle to the plane of the head portion, said shank portion comprising legs connected together for a distance along the longitudinal fold, said legs having pointed ends and being tapered between said connection and said pointed ends and being adapted to diverge when forced into fastening position.

3. A fastening device adapted to be driven, said device being fabricated from a flat metal strip bent at one end to provide a head portion and folded longitudinally to provide a shank portion lying in a plane at a right angle to the plane of the head portion, said shank portion comprising legs connected together for a distance along the longitudinal fold, said legs having divergently-bent pointed ends and being tapered between said connection and said pointed ends and being adapted to diverge when the fastening device is driven, said pointed ends being centrally located with respect to the head portion.

4. A fastening device adapted to be driven, said device being fabricated from a flat metal strip bent at one end to provide a head portion and folded longitudinally to provide a shank portion lying in a plane at a right angle to the plane of the head portion, said shank portion comprising legs joined together and to the head portion along the fold, said legs being beveled diagonally from the end of the fold to divergently-bent pointed ends and adapted to diverge when the fastening device is driven, said pointed ends lying in a plane approximately common to the plane of the longitudinal axis of the head portion.

ANDERS C. OLSEN.